United States Patent
High et al.

(10) Patent No.: US 10,535,037 B2
(45) Date of Patent: Jan. 14, 2020

(54) TARGETED LOCATION PRODUCT DELIVERY SYSTEMS AND METHODS

(71) Applicant: Walmart Apollo, LLC, Bentonville, AR (US)

(72) Inventors: Donald R. High, Noel, MO (US); Nathan G. Jones, Bentonville, AR (US); Chandrashekar Natarajan, San Ramon, CA (US); John P. Thompson, Bentonville, AR (US); Gregory A. Hicks, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 327 days.

(21) Appl. No.: 15/343,477

(22) Filed: Nov. 4, 2016

(65) Prior Publication Data
US 2017/0132566 A1 May 11, 2017

Related U.S. Application Data

(60) Provisional application No. 62/252,235, filed on Nov. 6, 2015.

(51) Int. Cl.
*G06Q 10/08* (2012.01)
*G01S 19/13* (2010.01)
(Continued)

(52) U.S. Cl.
CPC ..... *G06Q 10/08355* (2013.01); *B64C 39/024* (2013.01); *B64D 47/08* (2013.01);
(Continued)

(58) Field of Classification Search
CPC ........ G06Q 10/08355; B64C 2201/146; B64C 2201/128; B64C 39/024; G01S 19/14; G01S 19/13; B64D 47/08
See application file for complete search history.

(56) References Cited

U.S. PATENT DOCUMENTS 7,228,232 B2 6/2007 Bodin
9,031,779 B2 5/2015 Angelo
(Continued)

OTHER PUBLICATIONS

Johnston, Chris. "Amazon to Begin Testing Same-Day Delivery Drones in Cambridge." The Guardian, Guardian News and Media, Nov. 12, 2014, https://www.theguardian.com/technology/2014/nov/12/amazon-drones-cambridge-prime-air-testing. Retrieved Aug. 2019 (Year: 2014).*

(Continued)

*Primary Examiner* — Daniel Vetter
*Assistant Examiner* — Manal A. Alsamiri
(74) *Attorney, Agent, or Firm* — Fitch, Even, Tabin & Flannery LLP

(57) ABSTRACT

In some embodiments, systems, apparatuses and methods are provided herein useful to delivery packages using unmanned delivery aircrafts. Some embodiments include product delivery systems, comprising: a transceiver; a control circuit; a memory coupled to the control circuit and storing computer instructions that when executed by the control circuit cause the control circuit to perform the steps of: receive, from a customer, an authorization to deliver a product by an unmanned delivery aircraft; receive, from a portable user interface unit associated with the customer, global location information of a current location of the user interface unit and that designates a delivery location where the customer would like the product delivered; and initiate a delivery, by an unmanned delivery aircraft, of the product to the delivery location defined by the global location information received from the user interface unit.

14 Claims, 4 Drawing Sheets

(51) Int. Cl.
*B64D 47/08* (2006.01)
*B64C 39/02* (2006.01)

(52) U.S. Cl.
CPC ........ *G01S 19/13* (2013.01); *B64C 2201/128* (2013.01); *B64C 2201/146* (2013.01)

(56) References Cited

U.S. PATENT DOCUMENTS

| | | | |
|---|---|---|---|
| 9,550,577 | B1 | 1/2017 | Beckman |
| 9,573,684 | B2 | 2/2017 | Kimchi |
| 2006/0089792 | A1* | 4/2006 | Manber ............... G01C 21/3644 701/408 |
| 2014/0032034 | A1 | 1/2014 | Raptopoulos |
| 2014/0149244 | A1 | 5/2014 | Abhyanker |
| 2014/0330456 | A1* | 11/2014 | Lopez Morales ........................... G06Q 10/08355 701/3 |
| 2015/0094883 | A1* | 4/2015 | Peeters ................ B64C 19/00 701/3 |
| 2015/0120094 | A1* | 4/2015 | Kimchi ................ B64C 39/024 701/3 |
| 2015/0172238 | A1* | 6/2015 | Ahmed ................ H04L 51/08 709/217 |
| 2015/0277440 | A1 | 10/2015 | Kimchi |
| 2016/0068264 | A1* | 3/2016 | Ganesh ................ G08G 5/0069 701/2 |
| 2016/0189101 | A1* | 6/2016 | Kantor ................ G08G 5/0013 705/338 |
| 2016/0196755 | A1 | 7/2016 | Navot |
| 2016/0257401 | A1 | 9/2016 | Buchmueller |
| 2017/0011338 | A1* | 1/2017 | Stenneth ................ G06Q 50/30 |
| 2017/0011340 | A1* | 1/2017 | Gabbai .............. G06Q 10/0836 |
| 2017/0110017 | A1 | 4/2017 | Kimchi |
| 2017/0324898 | A9* | 11/2017 | Karunamuni .......... G03B 37/02 |

OTHER PUBLICATIONS

Fincher, Jonathan; "3D Robotics Announces GPS-Guided Quadcopter for the Masses"; http://www.gizmag.com/3droboticsirisgpsguidedquadcopterdrone/28818/; Aug. 27, 2013; pp. 1-7.

DJI; "Phantom 3 Advanced User Manual vol. 1.0"; http://www.dji.com/product/phantom-3; Apr. 2015; pp. 1-58.

UgCS; "Drone Technology Drone and RPAS engineering | UlgICS" http://www.dronetechnology.eu/ugcs/; Sep. 30, 2015; pp. 1-11.

Air Drone Craze; "Drone Tech—The Future of Drone Technology" http://www.airdronecraze.com/dronetech/; Sep. 30, 2015; pp. 1-20.

PCT; App. No. PCT/US2016/60277; International Search Report and Written Opinion dated Feb. 3, 2017.

* cited by examiner

TARGETED LOCATION PRODUCT DELIVERY SYSTEMS AND METHODS

CROSS-REFERENCE TO RELATED APPLICATION

This application claims the benefit of U.S. Provisional Application No. 62/252,235, filed Nov. 6, 2015, which is incorporated herein by reference in its entirety.

TECHNICAL FIELD

This invention relates generally to product deliveries using unmanned delivery aircraft.

BACKGROUND

In a modern retail environment, there is a need to improve the customer service and/or convenience for the customer. One aspect of customer service is the delivery of products. There are numerous ways to delivery products to customers. Getting the product to a delivery location, however, can cause undesirable delays, can add cost and reduce revenue.

BRIEF DESCRIPTION OF THE DRAWINGS

Disclosed herein are embodiments of systems, apparatuses and methods pertaining product delivery systems. This description includes drawings, wherein.

Figure 1:
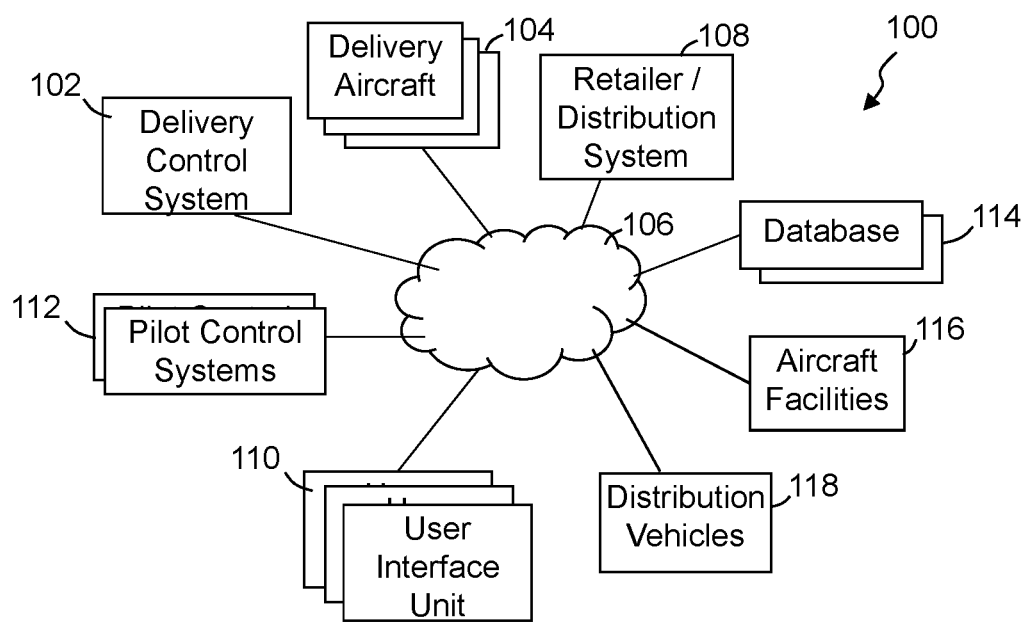
FIG. 1 illustrates a simplified plane view of an exemplary product delivery system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to deliver products to customer designated locations using unmanned delivery aircrafts. Some embodiments provide a product delivery system that controls unmanned delivery aircrafts (sometimes referred to as unmanned aerial vehicles (UAV)) in delivering products to customers based on location information and/or coordinates provided by customers', such as through their user interface units (e.g., smart phones, tablets, optical head-mounted display systems, smart watch systems, and the like). The product delivery system typically includes one or more communication transceivers communicationally coupled with a control circuit, and memory coupled to the control circuit that stores computer instructions. The control circuit, when executing the instructions, receives, from a customer, an authorization to deliver a product by an unmanned delivery aircraft. In some applications, the control circuit further receives, from a portable user interface unit associated with the customer, global location information of a current location of the user interface unit. The global location information designates a delivery location where the customer would like the product delivered. The delivery system can initiate a delivery of the product, by an unmanned delivery aircraft, to the delivery location defined by the global location information received from the user interface unit.

FIG. 1 illustrates a simplified plane view of an exemplary product delivery system 100, in accordance with some embodiments. The product delivery system includes one or more delivery control systems 102 and multiple unmanned delivery aircraft (UDA) 104 that are in communication over one or more distributed communication networks 106 with the one or more delivery control systems 102. One or more retailer and/or product distribution center systems 108 are accessible over the one or more distributed networks 106 by customers using customer devices (e.g., computer, laptop, user interface units 110, and/or other such devices). Customers can access a retailer system (e.g., through user devices, phone orders, going into a shopping facility, etc.) and purchase one or more products. Further, the customers may elect to have the purchased products delivered. The system includes and/or is accessible by multiple portable user interface units 110, each associated with at least one customer. The user interface units are in communication via the communication network 106 with retailer system 108, and in some applications can communicate with the delivery control system 102. Some embodiments may further include one or more pilot control systems 112, and one or more databases 114. Further, the system may includes one or more aircraft facilities 116 that house and maintain the unmanned delivery aircrafts, which in some implementations are cohoused with a retailer and/or a distribution center. Additionally, some embodiments utilize one or more distribution or launch vehicles 118 that transports one or more unmanned delivery aircrafts and products to be delivered by those aircraft to strategic launch locations from which one or more delivery aircrafts can be launched to implement the intended unmanned aerial delivery.

The delivery control system 102 is configured to receive orders from customers for one or more products that are to be delivered to customers. In some applications, the orders are received from the retailer systems 108. The retailer systems may be Internet market retailer sources, in-store order systems, and/or other such sources. Further, the orders may designate and/or request that the one or more products of the order are to be delivered by an unmanned delivery aircraft. Additionally or alternatively, customers may register with a retail entity that maintains a customer profile or record, and during the registration the customer may have authorized and/or requested products be delivered using the unmanned delivery aircraft.

Based on the received orders, the delivery control system can schedule deliveries and provide relevant routing and/or flight path information to a corresponding one of the unmanned delivery aircraft 104. The determined flight path may be based on a designated delivery location received from the customer. In some embodiments, the customers may use their portable user interface units 110 to specify a delivery location. Based on the specified delivery location, the delivery control system can determine a scheduled delivery location based on one or more factors, along with a flight path or route that an unmanned delivery aircraft is to travel while carrying the one or more products for delivery. Accordingly, some embodiments enable an unmanned delivery aircraft to be able to deliver a payload to a determined delivery location that is specified by the intended recipient.

Figure 2:
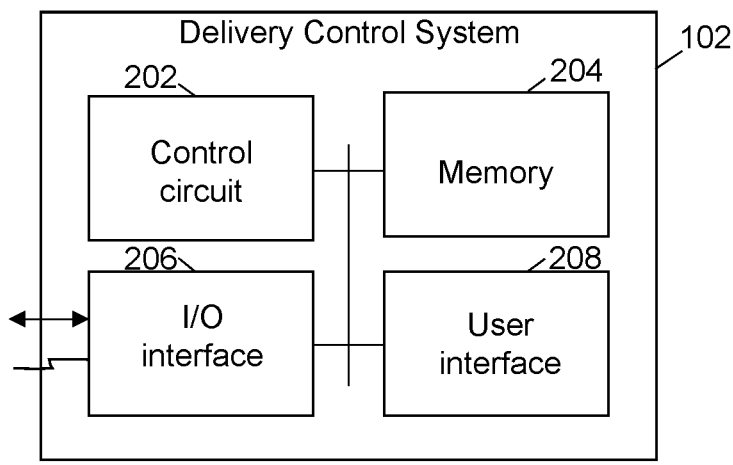
FIG. 2 illustrates a simplified block diagram of an exemplary delivery control system, in accordance with some embodiments.

FIG. 2 illustrates a simplified block diagram of an exemplary delivery control system 102, in accordance with some embodiments. The delivery control system includes one or more control circuits 202, memory 204, and input/output (I/O) interfaces and/or devices 206. Some embodiments further include one or more user interfaces 208.

The control circuit 202 typically comprises one or more processors and/or microprocessors. The memory 204 stores the operational code or set of instructions that is executed by the control circuit 202 and/or processor to implement the functionality of the delivery control system 102. In some embodiments, the memory 204 may also store some or all of particular data that may be needed to schedule deliveries, determine delivery locations, confirm delivery locations, determine flight paths, cause flight paths and/or flight instructions to be communicated to the unmanned delivery aircraft 104, and make any of the associations, determinations, measurements and/or communications described herein. Such data may be pre-stored in the memory, received from an external source (e.g., retailer system 108, user interface units 110, etc.), be determined, and/or communicated to the delivery control system.

It is understood that the control circuit 202 and/or processor may be implemented as one or more processor devices as are well known in the art. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 204 is shown as internal to the delivery control system 102; however, the memory 204 can be internal, external or a combination of internal and external memory. Additionally, the delivery control system typically includes a power supply (not shown) that is typically rechargeable, and/or it may receive power from an external source. While FIG. 2 illustrates the various components being coupled together via a bus, it is understood that the various components may actually be coupled to the control circuit 202 and/or one or more other components directly.

Generally, the control circuit 202 and/or electronic components of the delivery control system 102 can comprise fixed-purpose hard-wired platforms or can comprise a partially or wholly programmable platform. These architectural options are well known and understood in the art and require no further description here. The delivery control system and/or control circuit can be configured (for example, by using corresponding programming as will be well understood by those skilled in the art) to carry out one or more of the steps, actions, and/or functions described herein. In some implementations, the control circuit 202 and the memory 204 may be integrated together, such as in a microcontroller, application specification integrated circuit, field programmable gate array or other such device, or may be separate devices coupled together.

The I/O interface 206 allows wired and/or wireless communication coupling of the delivery control system 102 to external components, such as the unmanned delivery aircraft 104, retailer system 108, pilot control systems 112, databases 114, and other such devices or systems. Typically, the I/O interface 206 provides at least wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitter, receiver, transceiver, etc.

The user interface 208 may be used for user input and/or output display. For example, the user interface 208 may include any known input devices, such one or more buttons, knobs, selectors, switches, keys, touch input surfaces, audio input, and/or displays, etc. Additionally, the user interface 208 include one or more output display devices, such as lights, visual indicators, display screens, etc. to convey information to a user/worker, such as but not limited to product orders, product information, flight path mapping, flight path information, delivery aircraft parameter data, customer information, images, video, communication information (e.g., text messages, emails, etc.), status information, mapping information, operating status information, notifications, errors, conditions, and/or other such information. Similarly, the user interface 208 in some embodiments may include audio systems that can receive audio commands or requests verbally issued by a worker, and/or output audio content, alerts and the like.

Figure 3:
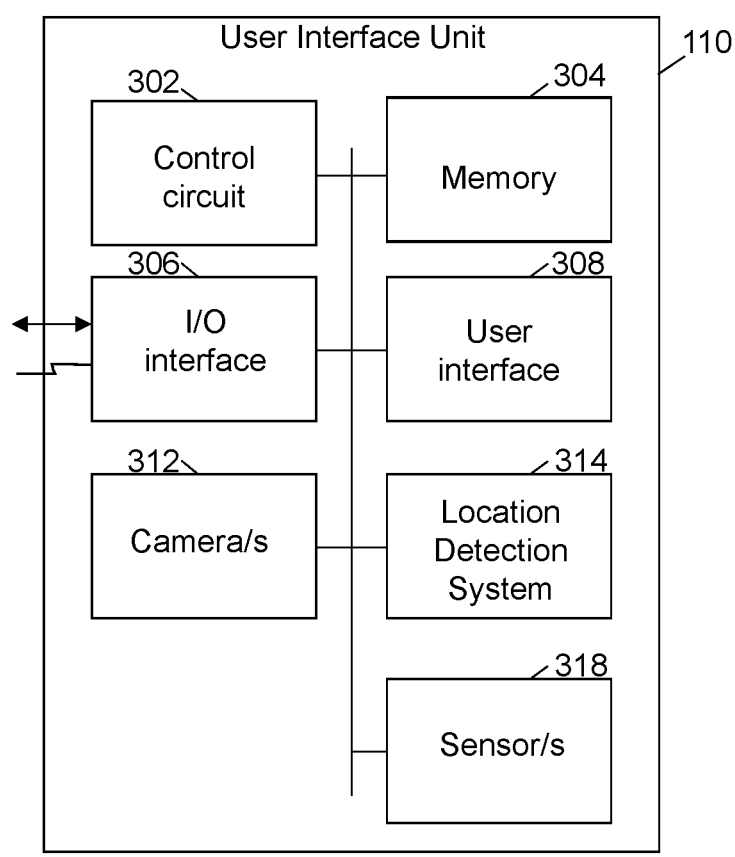
FIG. 3 illustrates a simplified block diagram of an exemplary user interface unit (UIU), in accordance with some embodiments.

FIG. 3 illustrates a simplified block diagram of an exemplary user interface unit (UIU) 110, in accordance with some embodiments. As introduced above, the user interface units 110 can include smart phones, tablets, optical head-mounted display systems, smart watch systems, and other such consumer electronic user devices. Further, the user interface units are portable and typically moved by customers so that the customer can position the user interface unit at least near a requested delivery location. The user interface unit includes one or more control circuits 302, memory 304, input/output (I/O) interfaces and/or devices 306, user interfaces 308, and one or more cameras 312. Additionally, the user interface unit typically includes a location detection system 316, and may further include one or more sensors 318, and/or other such systems.

The control circuit 302 comprises one or more processors and/or microprocessors that couple with one or more memory 304 that stores the operational code or set of instructions that is executed by the control circuit 302 and/or processor to implement the functionality of the user interface unit 110. In some embodiments, the memory 304 may also store some or all of particular data that may be needed to activate the designation of a delivery location, capture images and/or video, detect distances, obtain location information, and make any of the associations, determinations, measurements and/or communications described herein. Such data may be pre-stored in the memory, received from an external source, be determined, and/or communicated to the user interface unit. It is understood that the control circuit 302 and/or processor may be implemented as one or more processor devices as are well known in the art. Similarly, the memory 304 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 304 is shown as internal to the user interface unit 110; however, the memory 304 can be internal, external or a combination of internal and external memory. Additionally, the user interface unit typically includes a power supply (not shown) that is typically rechargeable, and/or it may receive power from an external source. While FIG. 3 illustrates the various components being coupled together via a bus, it is understood that the various components may actually be coupled to the control circuit 302 and/or one or more other components directly.

Generally, the control circuit 302 and/or electronic components of the user interface unit 110 can comprise fixed-purpose hard-wired platforms or can comprise a partially or wholly programmable platform. These architectural options are well known and understood in the art and require no further description here. The user interface unit and/or control circuit can be configured (for example, by using corresponding programming as will be well understood by those skilled in the art) to carry out one or more of the steps, actions, and/or functions described herein. In some implementations, the control circuit 302 and the memory 304 may be integrated together, such as in a microcontroller, application specification integrated circuit, field programmable gate array or other such device, or may be separate devices coupled together.

The I/O interface 306 allows wired and/or wireless communication coupling of the user interface unit 110 to external components, such as the delivery control system 102, the retailer system 108, pilot control system 112, other user interface unit, database 114, and other such devices or systems. Typically, the I/O interface 306 provides at least wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitter, receiver, transceiver, etc.

The user interface 308 may be used for user input and/or output display. For example, the user interface 308 may include any known input devices, such one or more buttons, knobs, selectors, switches, keys, touch input surfaces, audio input, and/or displays, etc. Additionally, the user interface 308 include one or more output display devices, such as lights, visual indicators, display screens, etc. to convey information to a customer, including but not limited to product information, order information, delivery schedule information, delivery location information, instructions, images and/or video, commands, options, communication information (e.g., text messages, emails, etc.), status information, mapping information, operating status information, notifications, errors, conditions, and/or other such information. Similarly, the user interface 308 in some embodiments may include audio systems that can receive audio commands or requests verbally issued by a worker, and/or output audio content, alerts and the like.

The one or more cameras 312 are configured to capture images and/or video. In operation, a customer can orient the user interface unit with a camera directed away from a requested delivery location, as further described below, and the camera can be activated to capture one or more images and/or video. Similarly, a camera may be directed at a requested delivery location such that an image is captured directed at the delivery location. The images and/or videos can be processed at the user interface unit and/or communicated to the delivery control system 102 to allow processing and confirmation of a viability of the requested delivery location. The delivery control system 102 may use additional information in validating the delivery location and one or more flight paths such as, but not limited to, satellite imagery data, maps, previously acquired images and/or video from delivery aircraft of areas at and/or around the requested delivery location, Google Maps imagery, government restrictions information corresponding to the delivery location and/or flight path, and other such information in validating the delivery location and/or one or more flight paths. For example, imagery of the delivery location may indicate that there are large trees surrounding the requested delivery location, there is less than a threshold amount of open space about the requested delivery location, there have been previous problems with other delivery aircraft being targeted in the area of the delivery location, and other such issues.

In some embodiments, the user interface unit 110 may receive location and/or movement information and/or include a location detection system 316 that is configured to determine a current location of the user interface unit and/or tracks movements of the user interface unit. The location detection system can provide relevant information in determining a requested delivery location. In some instances, the location detection system may include a global positioning detection system and/or system that received global positioning coordinate information. Additionally, the location detection system may include a Wi-Fi signal triangulation and/or evaluation system, cellular tower triangulation system, accelerometers, gyroscopes, compass, and/or other such location detection functionality. The user interface unit 110 may, in some implementations, further include one or more sensors 318. These sensors, at least in part, can be used in determining distance between the user interface unit and one or more objects (e.g., the ground, trees, bushes, power lines, etc.), magnetic radiation detection sensors and/or capture magnetometer interference, wireless signal strength sensor, and the like. For example, in some applications a user interface unit may report wireless communication signal strength, which may provide an indication of whether there is or may be a problems with wireless communication with the delivery aircraft and/or whether there is sufficient communication bandwidth to effectively receive images and/or video from the delivery aircraft and/or allow a pilot to take over at least some of the control of the delivery aircraft.

Customers can use their user interface units to specify a requested delivery location. By positioning the user interface unit at or proximate to a location where the customer wants the unmanned delivery aircraft to deliver the one or more products, the location detection system 316 can provide relevant location information to the user interface unit control circuit 302. For example, the customer may go into their backyard and activate an option to cause the user interface unit to capture the current location as a requested delivery location. The location information of the requested delivery location can be communicated to the delivery control system 102. Using the requested delivery location information, the delivery control system can evaluate the location, determine a viability of the desired location and/or an area around the requested delivery location.

As such, the delivery control system can provide instructions to one or more unmanned delivery aircrafts that controls the delivery based on relevant location information and/or coordinates provided by customer's user interface unit. In some embodiments, the control circuit 202 of the delivery control system 102 receives an authorization to deliver a product by an unmanned delivery aircraft. This authorization is typically designated by the customer, such as when purchasing the product, in response to a request whether the customer wants delivery by unmanned delivery aircraft, based on a selection of one of multiple options, based on previous instructions to deliver via unmanned delivery aircraft, and the like. For example, a customer may be accessing a retailer website and ordering a product. The website may provide the customer with the option to select delivery by unmanned delivery aircraft. Similarly, a software application (APP) operating on the user interface unit may display a graphical user interface with one or more options that allows the customer to select one or more of the options. One of those options may include an option to authorize delivery by unmanned delivery aircraft.

The control circuit 202 further receives global location information from a portable user interface unit 110 associated with the customer of a current location of the user interface unit. This location information designates a delivery location where the customer would like the product delivered. Again, as an example, the customer may want delivery to an area of her property. Accordingly, the customer can take the user interface unit to the desired delivery location and/or proximate a requested delivery location. The location information may be captured in response to a customer selecting an option, based on a duration of time the user interface unit is at a location during a period location detection period, in response to a confirmation of a location, and other such options. For example, the user may have activated an APP and/or upon selecting an option to deliver by unmanned delivery aircraft an application may be activated that provides a customer with instructions regarding acquiring the requested delivery location. As a specific example, the application may display and/or present audio instructions directing the customer to move to a requested delivery location. This can include information about requirements and/or preferred conditions for selecting a requested delivery location. For example, the instructions can inform the customer of approximate minimum sized and/or area of a clearing for the requested delivery location, that there are no powerlines within a threshold distance above and/or to the side of the delivery location, that there are no other obstructions above and/or within a threshold distance around the delivery location, that the location not be accessible by pets (at least during the scheduled delivery time), that there is not an airport within a predefined distance and/or radius, other such conditions, and typically a combination of two or more of such conditions. The application can provide the customer with an option to capture the current location of the user interface unit as the requested delivery location (e.g., an option displayed on the display of the user interface unit) that when selected causes the user interface unit to obtain location information, such as global location information (e.g., global positioning satellite (GPS) location coordinates), antenna triangulation location information, other such location information available through the user interface unit, or combination of two or more of such location information.

For example, some embodiments receive GPS coordinate information and one or more images in response to option selected in a graphical user interface displayed through an APP. Accordingly, the control circuit may receive the global location information and one or more images in response to a selection by the customer of a single option presented to a user through a software application implemented on the user interface unit that causes the user interface unit to identify the global location information and activate the camera to capture the one or more images.

With the location information obtained, the delivery control system 102 can then schedule delivery by an unmanned delivery aircraft, and initiate a delivery, by an unmanned delivery aircraft, of the one or more products to the delivery location defined by the global location information received from the user interface unit. Some embodiments, may further use pictures and/or video as part of a confirmation process to confirm a requested delivery location as a valid delivery location. Again, in some instances, the requested delivery location may be under an obstacle (e.g., a tree, a balcony, power lines, and the like) or within a threshold distance of an obstacle. As such, in some instances, the control circuit 202 of the delivery control system further receives one or more images and/or video captured by a camera 312 of the user interface unit 110.

In some embodiments, the one or more images and/or video is captured at approximately the time the global location information is identified by the user interface unit. For example, the instructions to the customer may direct the customer to position the user interface unit at the requested delivery location in a predefined orientation relative to the location at the requested delivery location where the product in intended to be delivered (e.g., oriented with a camera 312 pointing directly away from (e.g., 180 degrees) the location, and to activate an option that causes the location information to be captured and the one or more pictures and/or video to be captured. In some embodiments, the control circuit 302 may utilize information from one or more sensors 318 (e.g., inertial sensors, accelerometers, angle sensors, distance sensors, etc.), image processing, and the like to determine a relative orientation of the user interface unit relative to the requested delivery location and/or surface upon which a product is to be delivered, and provide instructions to the customer based on the sensor information and/or image processing regarding adjustments to the orientation, the angle of rotation, and the like of the user interface. Additionally or alternatively, the directions may instruct the user to move the user interface along a predefined pattern with the one or more cameras of the user interface unit in a predefined orientation such that a series of images are captured and/or video is captured (e.g., rotate the user interface unit 360 degrees around an axis that is generally parallel with the surface on which the customer desires the package to be delivered by the unmanned delivery aircraft). Again, in some embodiments, the control circuit 302 may utilize information from one or more sensors 318 (e.g., inertial sensors, accelerometers, distance sensors, angle sensors, etc.), image processing and the like to track movement of the user interface unit, and provide instructions to the customer based on the sensor information and/or image processing regarding the pace of rotation, the angle of rotation, and the like.

In some applications the control circuit 302 and/or a separate image processor of the user interface unit can evaluate the one or more pictures and/or video. In other embodiments, the control circuit 202 of the delivery control system and/or a separate image processor may additionally or alternatively evaluate the one or more images and/or video in confirming a viability of the requested delivery location for a delivery by the delivery aircraft. When the delivery location is confirmed as viable, the delivery can be authorized and/or initiated. The evaluation can include multiple different evaluations, including but not limited to whether there is vertical clearance at the requested delivery location. The control circuit can evaluate the one or more images and/or video to confirm there is a vertical clearance of at least a threshold diameter extending above the delivery location. With the delivery aircraft having to drop down toward the delivery location and/or lower the one or more products by a crane on the delivery aircraft, the space above the desired delivery location must be clear. As such, the evaluation can look for obstructions (e.g., tree branches, power lines, balconies, roofs, eves, bushes, and the like) that may interfere with the movement and/or control of the delivery aircraft, and/or the lowering of the one or more products by the crane.

Further, the evaluation may take into considerations multiple images, including images captured in directions 180 degrees from each other. Many user interface units may include oppositely oriented cameras 312. As such, the control circuit 302 may activate both oppositely oriented cameras to capture opposing images. For example, with the user interface unit positioned over the requested delivery location, the control circuit can activate both cameras simultaneously or sequentially to opposing images and/or video. The control circuit 202 of the delivery control system would receive at least two images directed away from each other such that a first image is captured of a ground or surface on which the delivery is to occur at the delivery location, and a second image is captured in a directed that is substantially 180 degrees from the direction captured by the first image and generally directed toward the sky. The delivery control system 102 can, in confirming the viability of the delivery location, confirm the ground as having a delivery area that has at least a delivery area threshold upon which the product can be deposited.

The delivery control system 102 can further evaluate the requested delivery location based on one or more other factors, such as whether an unmanned delivery aircraft is authorized to fly to the requested delivery location, whether there are legal factors that affect the delivery to the requested delivery location, whether there are surrounding buildings that would inhibit and/or adversely compromise the control of the delivery aircraft, whether the requested delivery location is in a public area (e.g., a park, parking lot, etc.), and other such factors. In some embodiments, the control circuit 202 of the delivery control circuit may in part confirming the requested delivery location is not in a no-fly zone and/or confirm there are no flight restrictions corresponding to the received global location information of the requested delivery location and one or more flight paths between a launch location and the requested delivery location that inhibit directing the delivery aircraft to the delivery location. Additionally or alternatively, the control circuit 202 may determine whether and/or confirm the delivery location is within a flight distance threshold of a launch location in confirming the viability of the requested delivery location.

Some embodiments further evaluate information obtained by the unmanned delivery aircraft while the unmanned delivery aircraft is in the process of traveling to the delivery location, while positioning itself relative to the delivery location, and/or while delivering one or more products to the delivery location, in controlling the delivery and/or confirming a viability of a delivery location. The information obtained by the delivery aircraft can include sensor information, images and/or video, weather condition information, status information and/or error conditions corresponding to one or more components of the delivery aircraft, other such information, or a combination of two or more of such information.

Figure 4:
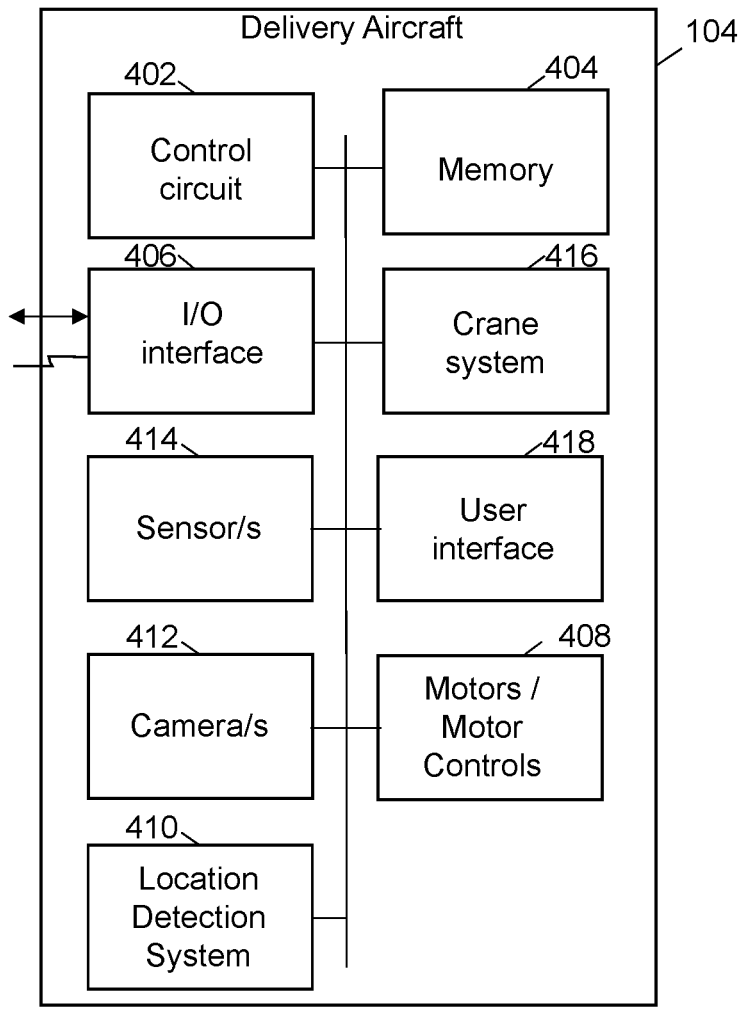
FIG. 4 illustrates a simplified block diagram of an exemplary delivery aircraft, in accordance with some embodiments.

FIG. 4 illustrates a simplified block diagram of an exemplary delivery aircraft 104, in accordance with some embodiments. The delivery aircraft includes one or more control circuits 402, memory 404, input/output (I/O) interfaces and/or devices 406, motors and motor control circuitry 408, location detection systems 410, and one or more cameras 412. Some embodiments further include one or more sensors 414, a crane system 416, a user interface 418, and/or other such systems. The control circuit 402 comprises one or more processors and/or microprocessors and couples with the memory 404 that stores operational codes or sets of instructions that are executed by the control circuit 402 and/or processor to implement the functionality of the delivery aircraft 104. In some embodiments, the memory 404 may also store some or all of particular data that may be needed to navigate to delivery locations and deliver one or more products. It is understood that the control circuit 402 may be implemented as one or more processor devices as are well known in the art. Similarly, the memory 404 may be implemented as one or more memory devices as are well known in the art, such as those described above. Further, the memory 404 is shown as internal to the delivery aircraft 104; however, the memory 404 can be internal, external and wirelessly accessible, or a combination of internal and external memory. Additionally, the delivery aircraft typically includes a power supply (not shown) that is typically rechargeable, and/or it may receive power from an external source. While FIG. 4 illustrates the various components being coupled together via a bus, it is understood that the various components may actually be coupled to the control circuit 402 and/or one or more other components directly.

The control circuit 402 and/or electronic components of the delivery aircraft 104 can comprise fixed-purpose hard-wired platforms or can comprise a partially or wholly programmable platform. These architectural options are well known and understood in the art and require no further description here. The delivery aircraft and/or control circuit can be configured (for example, by using corresponding programming as will be well understood by those skilled in the art) to carry out one or more of the steps, actions, and/or functions described herein. In some implementations, the control circuit 402 and the memory 404 may be integrated together, such as in a microcontroller, application specification integrated circuit, field programmable gate array or other such device, or may be separate devices coupled together.

The I/O interface 406 allows wired and/or wireless communication coupling of the delivery aircraft 104 to external components, such as delivery control system 102, the retailer system 108, pilot control system 112, in some instances one or more user interface units 110, and other such devices or systems. Typically, the I/O interface 406 provides at least wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitter, receiver, transceiver, etc.

The location detection system 410 obtains location information to determine a current location of and track the location and movements of the delivery aircraft. The control circuit 402 utilizes the location information in controlling the movements of the delivery aircraft. In some instances, the location detection system main include a global positioning detection system and/or system that received global positioning coordinate information, Wi-Fi signal triangulation and/or evaluation system, cellular tower triangulation system, and/or other such location detection system. Further, the location detection system may use information provided by one or more sensors 414 in determining and/or tracking location information. The sensors can include substantially any relevant sensor such as, but not limited to, one or more inertial sensors, accelerometers, altimeters, gyroscopes, compass, distance measurement systems (e.g., ultrasound, laser, etc.), and/or other such sensor information. Other sensors 414 may be included that may or may not be used for location detection, such as but not limited to wireless signal strength sensor, weather sensors, magnetic radiation detection sensors, movement detector (e.g., detecting movement within a threshold distance of the delivery location), and the like.

Typically, the delivery aircraft 104 includes one or more cameras 412 that capture images and/or video that can be evaluated by the control circuit 402 of the delivery aircraft and/or communicated to the delivery control system for processing. In operation, the control circuit 402 of the delivery aircraft can activate one or more of the cameras 412, and in some implementations activates a cameras based on a predefined delivery sequence (e.g., when within a threshold distance of the delivery location activate a camera to capture images and/or video, when hovering over the delivery site, while lower the product by a crane system 416, and the like), in response to a command from the delivery control system, in response to a pilot command received from the pilot control system 112, and the like. Some embodiments include different cameras directed in different general directions (e.g., up, down, forward, backwards), additionally or alternatively, one or more cameras may be cooperated with camera directional control systems (e.g., motors, tracks, gimbals, etc.) that can control the movement of one or more cameras. As introduced above, in some embodiments one or more pictures and/or video captured by the camera/s 412 of the delivery aircraft can be evaluated for one or more parameters, rules and/or conditions. For example, one or more images and/or video can be captured by the delivery aircraft of the delivery location and be evaluated to confirm a viability of the delivery location based on one or more rules and/or conditions. Further, in some applications video can be communicated to the pilot control system 112 to allow a pilot to see the conditions at and/or around the delivery location.

In some implementations, an unmanned delivery aircraft 104 may include a crane system 416 that allows a product being delivered to be lowered to the delivery site while the delivery aircraft hovers over the delivery site, and typically hovers at or above a threshold height above the delivery site. As such, the delivery aircrafts 104 in at least some embodiments have the ability to deliver one or more packages, products and/or cargo to an intended destination without having to physically land the delivery aircraft. In some implementations, the delivery aircraft can be controlled to maintain a stable hover above an intended delivery location (e.g., around 10-50 feet off above the intended delivery site and/or the ground). Maintaining the aircraft at an elevation can make the delivery safer to both humans, animals, property, and the like, for example because they would not encounter the spinning propellers of the delivery aircraft. The delivery aircraft, while hovering, can lower the package through a crane system 416. The crane system can include, for example, a crane motor that cooperates with a rotational drive shaft that is rotated by the crane motor, with one or more reels, spools or the like selectively cooperated with the drive shaft. Each crane system typically includes at least one cord, cable, rope, or the like that is unspooled and retracted through the rotation of a corresponding spool. The cord can be spooled out by the crane system to lower the package to the delivery site while the delivery aircraft 104 hovers over the delivery site. The control circuit 402 and/or a control circuit of the crane system can control the decent of the package by controlling a rate at which the delivery aircraft drops in elevation and/or controls the rate of spooling by the crane system in lowering the package. In some applications the crane system further includes and/or cooperates with a package release system. In some embodiments, the control circuit 402 triggers the release of a package, while in other implementations the package release system is a mechanical release without need of communication to trigger the release. The crane system, the delivery aircraft and/or the release system may in some embodiments be implemented in accordance with or similar to the delivery aircraft, crane systems, and/or release system described in U.S. Provisional Application No. 62/222,572, for Nathan G. Jones et al., filed Sep. 23, 2015, and entitled SYSTEMS AND METHODS OF DELIVERING PRODUCTS WITH UNMANNED DELIVERY AIRCRAFTS, and U.S. Provisional Application No. 62/222,575, for Nathan G. Jones, filed Sep. 23, 2015, and entitled PACKAGE RELEASE SYSTEM FOR USE IN DELIVERY PACKAGES, AND METHODS OF DELIVERING PACKAGES, which ARE incorporated herein by reference in their entirety.

In some implementations, the delivery aircraft may include one or more user interfaces 418 that can be used for user input and/or output display. For example, the user interface 418 may include any known input devices, such one or more buttons, knobs, selectors, switches, keys, touch input surfaces, audio input, and/or displays, etc. Additionally, the user interface 418 includes one or more output display devices, such as lights, visual indicators, display screens, etc. to convey information to a user. Similarly, the user interface 418 in some embodiments may include audio systems that can receive audio commands or requests verbally issued by a worker, and/or output audio content, alerts and the like.

In some applications, the control circuit 302 of the delivery aircraft 104, the control circuit 202 of the delivery control system 102 and/or a control circuit of a pilot control system 112 further receive one or more delivery aircraft images and/or video captured by one or more cameras on the delivery aircraft 104 while the delivery aircraft is positioned within a delivery distance threshold from the global positioning information corresponding to the determined delivery location. The one or more images and/or video from the delivery aircraft can be evaluated relative to one or more delivery rules (sometimes referred to as parameters and/or conditions). These delivery rules can include substantially any rule relative to human and/or animal safety, product safety, delivery aircraft safety, legal issues, control and/or lack of control issues, other such rules or combinations of two or more of such rules. These rules can include some or all of the conditions, parameters and/or concerns described above with regard to confirming a viability of the requested delivery location. As an example, one or more delivery aircraft images and/or video can be captured and evaluated to confirm there is a vertical clearance of at least a threshold diameter extending above the delivery location (e.g., detecting a tree that may interfere with the flight of the delivery aircraft). The delivery can commence when the confirmation is obtained and/or determined, based on the one or more delivery aircraft images and/or video, that one or more delivery rules are satisfied prior to initiating a delivery of the product.

Further, images, video and/or sensor data can continue to be monitored while a product is being delivered. For example, video processing can be performed to detect movement at or within a threshold distance of the delivery location. Based on the detected movement the delivery may be paused and/or terminated. As one specific example, the control circuit 202 may detect (e.g., based on detected movement, image processing, image recognition, etc.) that a customer's pet or child has moved into a delivery area, and the control circuit can cause the delivery aircraft to pause the delivery (which may include retracting a packaged suspended by a crane system), may cause the delivery aircraft to temporarily move away from the delivery location and/or may implement other actions. The delivery may commence in response to the control circuit detecting the removal and/or absence of the pet or child is no longer in the delivery area. The delivery may be terminated in a condition is not resolved within a threshold period of time. The customer is typically notified that the delivery was aborted, and may provide information about why it was aborted and/or how to reschedule a delivery or where the package can be picked up.

Further, in some instances, a pilot at a pilot control system 112 that is remote from the unmanned delivery aircraft may remotely take over control some of all of the flight and/or delivery controls of the delivery aircraft. The pilot control system wireless coupled with and communicates with the delivery aircraft (e.g., via cellular communication, satellite communication, Wi-Fi communication, other such wireless communication methods, a combination of two or more of such wireless communication methods, and/or a combination of wired and wireless communication methods. In some implementations, the pilot may take over control in response to a predefined condition, such as the delivery aircraft reaching an intended delivery location and/or traveling to within a predefined delivery location, in response to a delivery aircraft confirming a ready condition with the delivery aircraft hovering at a position relative to the delivery location, and other such conditions. Additionally or alternatively, a pilot may be notified of one or more events and/or conditions. These events and/or conditions can be error conditions (e.g., motor failure, sensor failure, problems validating a delivery location, communication problems, and/or other such conditions), detecting one or more conditions violate one or more rules (e.g., detected movement at the delivery location, failure to validate a delivery location, weather conditions (e.g., wind speeds above a threshold level, rain or rain in excess of threshold rate, hail, etc.), package imbalance, detection of movement within a threshold distance (e.g., detecting another aircraft within a threshold distance), and other such conditions), request by a customer, in response to a failure of the delivery aircraft to achieve delivery after a threshold number of attempts, and other such conditions.

Figure 5:
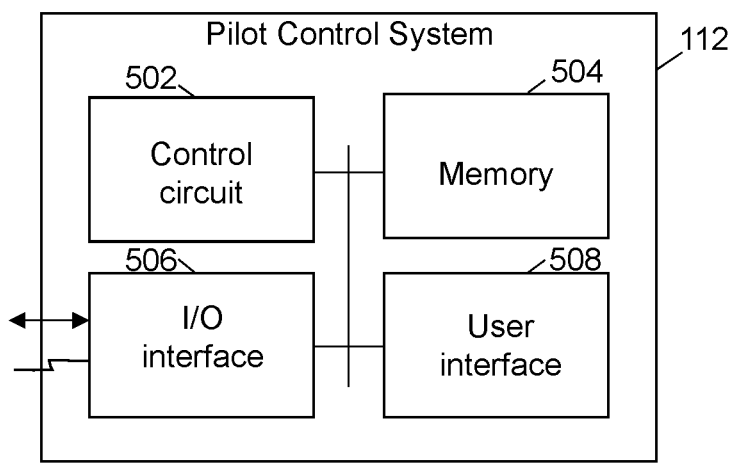
FIG. 5 illustrates a simplified block diagram of an exemplary pilot control system, in accordance with some embodiments.

FIG. 5 illustrates a simplified block diagram of an exemplary pilot control system 112, in accordance with some embodiments. The pilot control system includes one or more pilot control circuits 502, memory 504, input/output (I/O) interfaces and/or devices 506, user interfaces 508. The pilot control circuit 502 typically comprises one or more processors and/or microprocessors, and couples with the memory 504 to access operational code or set of instructions that are executed by the control circuit 502 to implement the functionality of the pilot control system 112. In some embodiments, the memory 504 may also store some or all of particular data that may be needed to remotely control the delivery aircrafts 104, and make any of the associations, determinations, measurements and/or communications described herein. It is understood that the control circuit 502 and/or memory 504 may be implemented as one or more processor devices and memory as are well known in the art, such as those described above. Further, the memory 504 is shown as internal to the pilot control system 112; however, the memory 504 can be internal, external or a combination of internal and external memory. While FIG. 5 illustrates the various components being coupled together via a bus, it is understood that the various components may actually be coupled to the control circuit 502 and/or one or more other components directly. In some implementations, the control circuit 502 and the memory 504 may be integrated together, such as in a microcontroller, application specification integrated circuit, field programmable gate array or other such device, or may be separate devices coupled together.

The I/O interface 506 allows wired and/or wireless communication coupling of the pilot control system 112 to external components, such as the unmanned delivery aircraft 104, delivery control system 102, retailer system 108, databases 114, and other such devices or systems. Typically, the I/O interface 506 provides at least wireless communication (e.g., cellular, satellite, Wi-Fi, Bluetooth, RF, and/or other such wireless communication), and in some instances may include any known wired and/or wireless interfacing device, circuit and/or connecting device, such as but not limited to one or more transmitter, receiver, transceiver, etc. The user interface 508 is used for user input and/or output display. For example, the user interface 508 may include any known input devices, such one or more buttons, knobs, selectors, switches, keys, touch input surfaces, joysticks, dials, audio input, and/or displays, etc. Additionally, the user interface 508 further includes one or more output display devices, such as lights, visual indicators, display screens, etc. to convey information to a user/worker, such as but not limited to video data, images, delivery location parameters and/or statistics, product information, flight path mapping, flight path information, delivery aircraft parameter data, customer information, communication information (e.g., text messages, emails, etc.), status information, mapping information, operating status information, notifications, errors, conditions, and/or other such information. Similarly, the user interface 508 in some embodiments may include audio systems that can receive audio commands or requests verbally issued by a worker, and/or output audio content, alerts and the like.

Further, some embodiments provide a bank of pilot control systems with one or more pilots manning the pilot control systems while delivery aircraft are scheduled to and/or while delivery aircraft are delivering products. Through the pilot control system a pilot can remotely take over at least some of the controls of a delivery aircraft. The pilot control circuit can receive a notification that pilot assistance is requested while the delivery aircraft is within a threshold pilot control distance of the delivery location. Remote control over at least some of the controls of the delivery aircraft can be established through the transceiver and in response to the notification. As such, commands can be received through the user interface 508 from a pilot, and be communicated to the delivery aircraft to implement the commands such that the pilot controls at least some aspects of the delivery aircraft and/or takes over total control of the delivery aircraft. Typically, the pilot control can take over control during any time the delivery aircraft is preparing for flight, in flight, and/or shortly after flight. For example, in some instances, a pilot may take over at least partial control at least during a depositing of the product at the delivery location.

As described above, some embodiments utilize launch vehicles 118. One or more delivery aircraft 104 and products to be delivered can be loaded into the launch vehicles. Based on scheduled deliveries, the launch vehicles can be routed to predetermined launch locations that are within a predefined flight distance (e.g., based on battery power, weight of the package being delivered, weather conditions, etc.) of one or more scheduled delivery locations. The one or more delivery aircraft, which are cooperated with one or more of the products to be delivered, can then be launched from the launch vehicles. The launch vehicle 118 can travel to multiple different launch locations to implement multiple different scheduled deliveries.

Figure 6:
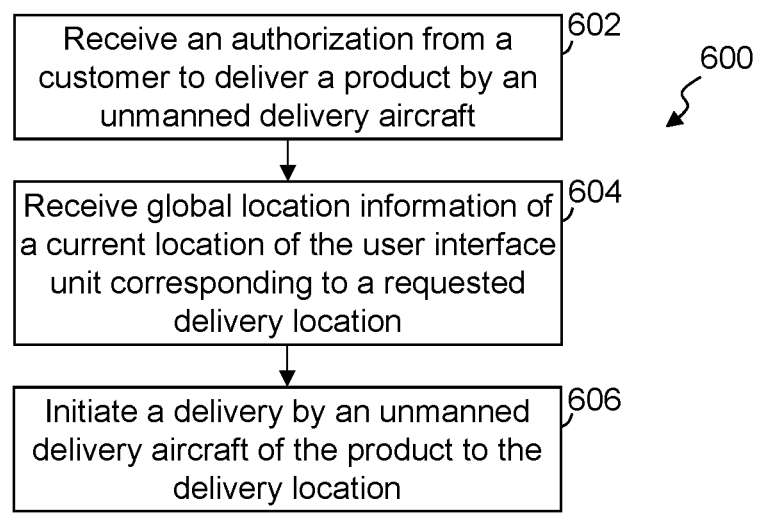
FIG. 6 illustrates a simplified flow diagram of an exemplary process of delivering products using unmanned delivery aircrafts, in accordance with some embodiments.

FIG. 6 illustrates a simplified flow diagram of an exemplary process 600 of delivering products using unmanned delivery aircrafts, in accordance with some embodiments. In step 602, an authorization is received from a customer to deliver a product by an unmanned delivery aircraft. Again, this may be an option selected through a web site on which the customer purchased a product, through an APP on the customer's user interface unit 110, based on a preselection when registering to participate in a delivery service, or the like. In step 604, global location information is received, from a portable user interface unit 110 associated with the customer, of a current location of the user interface unit and that designates a delivery location where the customer would like the product delivered. Typically, the delivery control circuit receives this information and confirms the viability of the requested delivery location. Further, the delivery control circuit can determine a flight path from a selected launch location. The launch location may be from a distribution center, a shopping facility (e.g., retail sales facility, or any other type of facility in which products are displayed and/or sold, etc.), a selected location based on one or more deliveries within a given geographic region or area, and the like.

In step 606, a delivery is initiated by an unmanned delivery aircraft of the product to the delivery location defined by the global location information received from the user interface unit. In some implementations, the delivery aircraft utilized locally determined location information and other sensor data to fly along the designated flight path to the delivery location and delivers the package without user interaction. In some instances, the delivery control system may track the progress of the delivery aircraft and/or the delivery, and may further continue to provide updated information regarding flight control and the flight path. Similarly, the delivery control system may evaluate the delivery location based on information provided by the delivery aircraft, and can validate the delivery location and communicate an authorization to deliver the product once validated.

In some embodiments, one or more images and/or video are received at the control circuit 202 of the delivery control system 102 that were captured by a camera of the user interface unit 110. Further, in some instances, the one or more images and/or video is captured at approximately the time the global location information is identified by the user interface unit. The one or more images and/or vide are evaluated, and a viability of the delivery location is confirmed for a delivery by the delivery aircraft. The delivery can be initiated and/or authorization to complete the delivery can be communicated when the delivery location is confirmed as viable. Typically, the evaluation of the one or more images further includes confirming there is a vertical clearance of at least a threshold diameter extending above the delivery location. Some embodiments evaluate more than one image. As such two or more images may be received that are directed away from each other such that a first image is captured of a ground at the delivery location and a second image is captured in a directed that is substantially 180 degrees from the direction captured by the first image and generally directed toward the sky. The confirmation of the viability of the delivery location can include confirming the ground has a delivery area that has at least a delivery area threshold upon which the product can be deposited. The global location information and the one or more images may be received from the user interface unit in response to a selection by the customer of a single option presented to the user through a software application implemented on the user interface unit that causes the user interface unit to identify the global location information and activate the camera to capture the image.

Further, some embodiments further confirm the delivery location is within a flight distance threshold of a launch location. Similarly, the confirmation can include confirming there are no flight restrictions corresponding to the received global location information and one or more flight paths between the launch location and the delivery location that inhibit directing the delivery aircraft to the delivery location.

Additionally, some embodiments perform a subsequent confirmation after the requested delivery location is accepted as a valid delivery location based on information provided by the unmanned delivery aircraft when the delivery aircraft is approaching and/or above the delivery location. For example, some applications receive one or more delivery aircraft images and/or video captured by one or more cameras on the delivery aircraft while the delivery aircraft is positioned within a delivery distance threshold from the global positioning information. The one or more images and/or video can be evaluated at the delivery aircraft 104 and/or the delivery control system 102 to confirm that one or more delivery rules are satisfied prior to initiating a delivery of the product. Further, some embodiments further receive a notification that pilot assistance is requested while the delivery aircraft is within a threshold pilot control distance of the delivery location. Remote control by a pilot can be established, through a transceiver of a pilot control system and in response to the notification, over the delivery aircraft such that commands received through a user interface of the pilot control system and from a pilot are communicated to the delivery aircraft to implement the commands such that the pilot controls the delivery aircraft during a depositing of the product at the delivery location.

As described above, typically a customer purchases and/or orders a product for delivery from one or more retailers. The retailer system 108 receives the order. For example, the retailer system may receive the order from an ecommerce website maintained by the retailer or third party identifying the one or more products ordered by the customer. The retailer system further receives confirmation that the customer has agreed to receive a package by unmanned delivery aircraft. In some instances, the user selects an option on a website maintained by the retailer or third party. As part of the delivery, the retailer system initiates the delivery by having the ordered product acquired (e.g., from a shopping facility and/or distribution center).

In response to the agreement to receive delivery by unmanned delivery aircraft, the retailer system and/or third party (e.g., through the website, an ecommerce APP on the customer's user interface unit, or the like) is instructed to identify a requested delivery location or zone. In some embodiments, a customer requests to participate in a service and installs an application (APP) on their user interface unit 110. In response to agreeing and/or requesting an ordered product be delivered via unmanned delivery aircraft (e.g., through the APP), the customer can be instructed to go to the desired delivery location where the delivery aircraft is to place the package. In some instances, the APP provides the customer with instructions regarding identifying and selecting a relevant requested delivery location. The customer can activate the user interface unit to identify the current location as the requested delivery location. For example, the customer may presses an option (e.g., press a "place here" button) displayed through the application and on the display of the user interface unit. The application can record location information (e.g., GPS coordinates) and typically takes one or more pictures of an area around the requested delivery location. The application then sends the coordinates (e.g., GPS coordinates) and typically one or more images to the delivery control system 102 via the internet, cellular service, or the like.

The delivery control system 102 confirms the requested delivery location as a valid and viable delivery location, or notifies the customer that the requested delivery location is invalid and requests an alternative delivery location be specified. The notification to the customer can explain why the requested location is invalid allowing the customer to correct any issues that prevent the location from being confirmed and/or provide additional guidance to the customer for subsequent location selection. The coordinates and one or more images can be used by the delivery control system 102 to verify that the requested area is appropriate (e.g., free and clear, accessible by flight, etc.) for the unmanned delivery aircraft 104 to deliver a package. The delivery control system can then generate one or more desired and/or optimized flight paths for the delivery aircraft, using the location information, between a source and/or launch location to the confirmed delivery location. The optimized path can take into account potential problems, such as airports, government buildings, other no-fly areas, problems experienced during one or more previous deliveries to the requested delivery location and/or other nearby locations, and the like. The delivery control system typically further schedules the delivery and notices the customer of the scheduled delivery time or time range (e.g., between 1:00 PM-4:00 PM). In some applications, the customer may change the delivery location and/or a scheduled delivery time. Limits may be set as to how close to a scheduled delivery time a customer can issue a request to change the delivery location and/or time. In some implementations, however, the customer may change the delivery location at any time up until the delivery aircraft takes off.

In some implementations, the retailer system 108 may instruct that the product be moved to a location that is within a threshold distance of the delivery location when the requested product is not already within the threshold distance. This may include directing and/or ordering the requested product from a distribution center to an intended launch location. Additionally or alternatively, the movement of the product by a launch vehicle that is loaded with the product (and typically other products to be delivered to other customers) along with one or more delivery aircraft, and are transported by the launch vehicle to a launch location that is within the threshold distance of the requested delivery location.

Prior to the scheduled delivery, the delivery aircraft 104 is loaded with the package that includes the one or more products. The delivery control system 102 communicates the optimized path to the delivery aircraft 104 that uses the path information to navigate to the delivery location, and to return to a launch location. Using location information (e.g., GPS coordinates), the delivery aircraft flies along the designated delivery flight path. In some instances, the delivery aircraft may have to deviate or detour from the provided flight path due to obstacles (e.g., detected by sensors) and/or other issued. Deviation information can be communicated to the delivery control system that can determine adjusted flight path and/or the control circuit 302 of the delivery aircraft may locally adjust the flight path, which may depend on an amount of deviation preformed.

In some embodiments, when the unmanned delivery aircraft 104 is within a threshold distance of the delivery location and/or arrives at the delivery location, the delivery aircraft may confirm the delivery location. This may include processing one or more sensor data, image processing and/or video processing of the delivery location and the like. For example, the delivery aircraft may hover and/or implement a circular route that is a predefined radius around the delivery location while maintaining an altitude that is a threshold altitude above the delivery location while capturing one or more images and/or video. This information can be evaluated in confirmation the location is valid and/or that is predicted a delivery can be accomplished.

The delivery aircraft upon reaching the delivery location attempts to deliver the packages. This can include landing the delivery aircraft at or near the delivery location, hovering at a threshold crane elevation above the delivery location and activating a crane system to lower the package to the delivery location, and/or other such actions. When the delivery is successful the delivery aircraft returns to the launch location and/or continues to one or more subsequent delivery locations when carrying more than a single package intended for different delivery locations. Alternatively, when there are one or more issues inhibiting the delivery, the delivery control system may activate a pilot at a pilot control system to aid in attempting to deliver the package. In some instances, a pilot may always be activated to control the delivery aircraft during the actual delivery phase (e.g., based on laws within certain areas, based on weather conditions, and the like). In other instances, however, the pilot is notified when there are issues that inhibit the delivery aircraft autonomously preforming the delivery. Additionally the customer may be notified of the one or more issues. Further, in some instances instructions may be provided to the customer about actions to take to address an issue. For example, in some instances a customer may be contacted (e.g., via their user interface unit) during and/or prior to the delivery aircraft traveling to the delivery location. This can ensure the customer is available to receive the package and to take one or more actions if needed. As a further example, the customer may be requested to move one or more pieces of outdoor equipment, remove a pet, and the like. The customer can also be notified when delivery cannot be accomplished and/or request the customer designate a different delivery location, which would be evaluated and confirmed. Such responses and actions by the customer would have to be confirmed within a threshold time, as the delivery aircraft have limited time that they can maintain flight.

In some embodiments, systems, apparatuses and methods are provided to enhance delivery of packages and/or cargo through the use of unmanned delivery aircraft. Some embodiments include product delivery systems, comprising: a transceiver; a control circuit; a memory coupled to the control circuit and storing computer instructions that when executed by the control circuit cause the control circuit to perform the steps of: receive, from a customer, an authorization to deliver a product by an unmanned delivery aircraft; receive, from a portable user interface unit associated with the customer, global location information of a current location of the user interface unit and that designates a delivery location where the customer would like the product delivered; and initiate a delivery, by an unmanned delivery aircraft, of the product to the delivery location defined by the global location information received from the user interface unit.

Some embodiments, provide methods of delivery products using unmanned delivery aircrafts, comprising: by a control circuit: receiving, from a customer, an authorization to deliver a product by an unmanned delivery aircraft; receiving, from a portable user interface unit associated with the customer, global location information of a current location of the user interface unit and that designates a delivery location where the customer would like the product delivered; and initiating a delivery, by an unmanned delivery aircraft, of the product to the delivery location defined by the global location information received from the user interface unit.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A product delivery system, comprising:
  a transceiver;
  a control circuit;
  a memory coupled to the control circuit and storing computer instructions that when executed by the control circuit cause the control circuit to perform the steps of:
  receive, from a customer, an authorization to deliver a product by an unmanned delivery aircraft;
  receive, from a portable user interface unit associated with the customer, location information of a current location of the user interface unit and that designates a delivery location where the customer would like the product delivered;
  receive an image captured by a camera of the user interface unit, wherein the image is captured at approximately the time the location information is identified by the user interface unit and prior to scheduling the delivery;
  evaluate the image, confirm from the image there is a vertical clearance of at least a threshold diameter extending above the delivery location, and confirm a viability of the delivery location for a delivery by the delivery aircraft;
  receive, from the user interface unit, wireless communication signal strength and identify the delivery location as invalid when there is not a sufficient communication bandwidth to effectively allow a remote pilot at a location remote from the delivery location to take over at least some of the control of the delivery aircraft;
  identify, based in part on the image, when the delivery location is invalid, and communicate a notification to the user interface unit to be displayed by the user interface unit, wherein the notification comprises an explanation of why the delivery location is invalid;
  communicate corrective instructions, in response to the identification that the delivery location is invalid based on the image, to the user interface unit comprising actions to be taken by the customer to address an issue inhibiting delivery to the delivery location, and confirm the action is taken within a threshold time;
  initiate a delivery, by an unmanned delivery aircraft, of the product to the delivery location defined by the location information received from the user interface unit; and
  wherein the initiating the delivery comprises initiating the delivery when the delivery location is confirmed as viable;
  wherein the control circuit, in receiving the image captured by the camera of the user interface unit, is configured to receive two images directed away from each other such that a first image is captured of a surface where the product is to be deposited by the unmanned delivery aircraft at the delivery location and a second image is captured in a directed that is substantially 180 degrees from the direction captured by the first image and generally directed toward the sky;
  wherein the control circuit in confirming the viability of the delivery location is further configured to confirm based on at least the first image that the surface where the product is to be deposited by the unmanned delivery aircraft as having a delivery area that has at least a delivery area threshold upon which the product can be deposited.

2. The system of claim 1, wherein the control circuit in confirming the viability of the delivery location is further configured to:
  confirm the delivery location is within a flight distance threshold of a launch location; and
  confirm there are no flight restrictions corresponding to the received location information and one or more flight paths between the launch location and the delivery location that inhibit directing the delivery aircraft to the delivery location.

3. The system of claim 1, wherein the control circuit in receiving the location information and the image comprises receiving both the location information and the image in response to a selection by the customer of a single option presented to a customer through a software application implemented on the user interface unit that causes the user interface unit to identify the location information and activate the camera to capture the image.

4. The system of claim 1, wherein the control circuit is further configured to:
  receive a delivery aircraft image captured by an aircraft camera on the delivery aircraft while the delivery aircraft is positioned within a delivery distance threshold from the location information; and obtain a confirmation, based on the delivery aircraft image, that one or more delivery rules are satisfied prior to initiating a delivery of the product.

5. The system of claim 1, further comprising:
a pilot control system comprising:
a pilot control circuit, a user interface coupled with the pilot control circuit, and a transceiver, wherein the pilot control circuit is configured to:
receive a notification that pilot assistance is requested while the delivery aircraft is within a threshold pilot control distance of the delivery location; and
establish, through the transceiver and in response to the notification, remote control over the delivery aircraft such that commands received through the user interface from a pilot are communicated to the delivery aircraft to implement the commands such that the pilot controls the delivery aircraft during a depositing of the product at the delivery location.

6. A method of delivery products using unmanned delivery aircrafts, comprising:
by a control circuit:
receiving, from a customer, an authorization to deliver a product by an unmanned delivery aircraft;
receiving, from a portable user interface unit associated with the customer, location information of a current location of the user interface unit and that designates a delivery location where the customer would like the product delivered;
initiating a delivery, by an unmanned delivery aircraft, of the product to the delivery location defined by the location information received from the user interface unit;
receiving an image captured by a camera of the user interface unit, wherein the image is captured at approximately the time the location information is identified by the user interface unit; and
evaluating the image, confirming from the image there is a vertical clearance of at least a threshold diameter extending above the delivery location and confirming a viability of the delivery location for a delivery by the delivery aircraft;
receiving, from the user interface unit, wireless communication signal strength and identifying the delivery location as invalid when there is not a sufficient communication bandwidth to effectively allow a remote pilot at a location remote from the delivery location to take over at least some of the control of the delivery aircraft;
identifying, based in part on the image, when the delivery location is invalid, and communicating a notification to the user interface unit to be displayed by the user interface unit, wherein the notification comprises an explanation of why the delivery location is invalid; and
communicating corrective instructions, in response to the identification that the delivery location is invalid based on the image, to the user interface unit comprising actions to be taken by the customer to address an issue inhibiting delivery to the delivery location, and confirm the action is taken within a threshold time;
wherein the initiating the delivery comprises initiating the delivery when the delivery location is confirmed as viable;
wherein the receiving the image captured by the camera of the user interface unit further comprises receiving two images directed away from each other such that a first image is captured of a ground at the delivery location and a second image is captured in a directed that is substantially 180 degrees from the direction captured by the first image and generally directed toward the sky;
wherein the confirming the viability of the delivery location further comprises confirming the ground as having a delivery area that has at least a delivery area threshold upon which the product can be deposited.

7. The method of claim 6, wherein the confirming the viability of the delivery location further comprises:
confirming the delivery location is within a flight distance threshold of a launch location; and
confirming there are no flight restrictions corresponding to the received location information and one or more flight paths between the launch location and the delivery location that inhibit directing the delivery aircraft to the delivery location.

8. The method of claim 6, wherein the receiving the location information and the image comprises receiving both the location information and the image in response to a selection by the customer of a single option presented to a customer through a software application implemented on the user interface unit that causes the user interface unit to identify the location information and activate the camera to capture the image.

9. The method of claim 6, further comprising:
receiving a delivery aircraft image captured by an aircraft camera on the delivery aircraft while the delivery aircraft is positioned within a delivery distance threshold from the location information; and
obtaining a confirmation, based on the delivery aircraft image, that one or more delivery rules are satisfied prior to initiating a delivery of the product.

10. The method of claim 6, further comprising:
receiving, at a control circuit of a pilot control system, a notification that pilot assistance is requested while the delivery aircraft is within a threshold pilot control distance of the delivery location; and
establishing, through a transceiver of the pilot control system and in response to the notification, remote control over the delivery aircraft such that commands received, from a pilot through a user interface of the pilot control system, are communicated to the delivery aircraft to implement the commands such that the pilot controls the delivery aircraft during a depositing of the product at the delivery location.

11. The system of claim 1, wherein the control circuit is further configured to:
receive sensor data from the user interface unit;
determine a relative orientation of the user interface unit relative to an intended surface upon which the product is to be deposited; and
communicate instructions to the user interface unit to be presented by the user interface unit to the customer directing the customer to move the user interface unit relative to the intended delivery location while continuing to capture sensor data.

12. The system of claim 11, wherein the control circuit in communicating the instructions to the user interface unit is further configured to communicate the instructions comprising instructions to the user to move the user interface unit in a specified pattern relative to the intended delivery location while at least the camera is active capturing a series of images;
wherein the control circuit in evaluating the image is configured to evaluate the series of images and identify, prior to scheduling the delivery and based on the series of images captured by the user interface while moved in accordance with the pattern, that one or more delivery rules are satisfied prior to initiating the delivery of the product in confirming the viability of the delivery location for a delivery by the delivery aircraft.

13. The system of claim 12, wherein the control circuit in communicating the instructions to the user interface unit is configured to track movement of the user interface unit based on sensor data and communicate instructions in response to the sensor data regarding a pace of movement and an angle of movement of the user interface unit.

14. The system of claim 11, wherein the control circuit is further configured to:
receive additional images of the delivery location captured while the unmanned delivery aircraft is within a delivery threshold distance of the delivery location, and confirm based on the additional images that the delivery location continues to satisfy one or more delivery rules prior to depositing the product at the delivery location.

* * * * *